(12) United States Patent
Elkhoury et al.

(10) Patent No.: US 6,205,507 B1
(45) Date of Patent: *Mar. 20, 2001

(54) MEMORY COHERENCY IN A PROCESSOR-TO-BUS CYCLE IN A MULTI-PROCESSOR SYSTEM

(75) Inventors: Bassam N. Elkhoury, Longmont, CO (US); Scott T. McFarland, Kingwood; Miguel A. Perez, Tomball, both of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/662,480

(22) Filed: Jun. 13, 1996

(51) Int. Cl.[7] ................................................. G06F 13/24
(52) U.S. Cl. .................... 710/260; 710/264; 710/265; 710/266; 710/268; 711/120; 711/122; 711/146; 711/152; 711/167; 711/141; 711/125; 711/131
(58) Field of Search ...................................... 395/733, 425, 395/470, 440, 473, 250, 750; 364/200; 711/122, 120, 146, 152, 141, 167, 125, 131; 710/260, 264, 266, 265, 268

(56) References Cited

U.S. PATENT DOCUMENTS

| | | | |
|---|---|---|---|
| 5,072,369 | * 12/1991 | Theus et al. ........................ 395/425 |
| 5,163,143 | * 11/1992 | Culley et al. ....................... 395/425 |
| 5,265,235 | * 11/1993 | Sindhu et al. ...................... 711/120 |
| 5,327,570 | * 7/1994 | Foster et al. ........................... 712/1 |
| 5,404,489 | * 4/1995 | Woods et al. ....................... 711/152 |
| 5,426,765 | * 6/1995 | Stevens et al. ..................... 711/131 |
| 5,459,842 | * 10/1995 | Begun et al. ....................... 395/250 |
| 5,469,555 | * 11/1995 | Ghosh et al. ....................... 395/460 |
| 5,553,265 | * 9/1996 | Abato et al. ....................... 395/470 |
| 5,590,341 | * 12/1996 | Matter ................................ 395/750 |
| 5,617,557 | * 4/1997 | Stevens .............................. 395/473 |
| 5,623,625 | * 4/1997 | Thompson et al. ................ 395/440 |
| 5,627,993 | * 5/1997 | Abato et al. ....................... 395/470 |
| 5,652,894 | * 7/1997 | Hu et al. ............................. 713/300 |

OTHER PUBLICATIONS

Compaq Computer ProLiant 2000, "QuickSpecs", Product Buletin, Doc. No. 041C/0595 (May 1995).
Compaq Computer ProLiant 4000, "QuickSpecs", Product Buletin, Doc. No. 043C/0595 (May 1995).
Compaq Computer Corporatiion "Proliant" 2000 Series Models.
Compaq Computer Corporation "Proliant"4000 Series Models.

* cited by examiner

Primary Examiner—Ayaz R. Sheikh
Assistant Examiner—Frantz Jean
(74) Attorney, Agent, or Firm—Sharp Comfort & Merrett, P.C.

(57) ABSTRACT

In a method and system for use in connection with performing a processor-to-bus cycle in a multi-processor computer system, the processor-to-bus cycle is interrupted before completion and an operation to save data in memory is performed. Thereafter, the interrupted processor-to-bus cycle is resumed.

14 Claims, 4 Drawing Sheets

MEMORY COHERENCY IN A PROCESSOR-TO-BUS CYCLE IN A MULTI-PROCESSOR SYSTEM

CROSS REFERENCE TO RELATED APPLICATIONS

This application is related to U.S. patent application Ser. Nos. 08/662,479 (now U.S. Pat. No. 5,752,265) and 08/662,491 (now U.S. Pat. No. 5,809,534), both of which were filed on Jun. 13, 1996 and are assigned to the assignee of the present application.

BACKGROUND OF THE INVENTION

The present invention relates to memory coherency in a processor-to-bus cycles in a multi-processor system.

Many computer systems include multiple processors, such as central processing units (CPUs), which may perform various operations requiring access to a main memory. Examples include reading or writing data from or to the main memory. In these systems, several CPUs may perform operations with respect to data stored in a particular main memory address during the same time interval. Furthermore, a particular CPU may retrieve data from the main memory, modify the retrieved data, and then write the modified data to the specified main memory address.

To enhance the speed capabilities of the system, many computer systems have cache memories associated with the CPUs in addition to the system's main memory. The cache memories are used for the temporary storage of data which the CPUs use during performance of various other operations.

Data is typically transferred between the main memory and the CPUs through one or more buses. A central processor controls access to the bus and determines which CPU or other system component will be given access to the bus at any given time. The central processor thus allows specified bus or memory cycles to be performed before performance of other cycles involving the storage, retrieval and transmission of data from one system component to another system component. One purpose of such priority techniques is to ensure that data stored in the main memory does not become stale. These priority techniques thus help prevent one system component from accessing data in the main memory which was previously modified by another system component but which has not yet returned to the main memory.

SUMMARY OF THE INVENTION

In general, in one aspect, the invention features performing a processor-to-bus cycle in a multi-processor computer system. The processor-to-bus cycle is interrupted before completion, and an operation to save data in memory is performed. Thereafter, the interrupted processor-to-bus cycle is resumed.

Certain implementations of the invention include one or more of the following features. The operation to save data in memory may include flushing a data queue to the memory. It may also include performing a snoop routine with respect to data in the queue to help ensure that the data stored in the main memory is not stale. A write back operation may be performed as a result of the snoop routine. The processor-to-bus cycle may be a cycle to a peripheral component interface (PCI) bus, and performing an operation to save data may include flushing a PCI-to-memory queue. The processor-to-bus cycle may be interrupted prior to assertion of an address strobe signal. Access to a host bus to perform the snoop routine may be requested in response to detecting the processor-to-bus cycle, and the processor-to-bus cycle may be interrupted in response to the request. Interrupting the processor-to-bus cycle may include denying access to the host bus to the processor that initiated the cycle. Resuming the interrupted cycle may include returning control of the host bus to a distributed controller associated with the processor that initiated the processor-to-bus cycle. Resuming the interrupted cycle may also include granting access to the host bus to the processor that initiated the cycle.

Certain implementations of the invention provide one or more of the following advantages. A processor-to-bus cycle may be interrupted, rather than terminated, and resumed at a later time. As a result, certain bus arbitration periods, during which a determination is made as to which system component will be granted access to a bus, may be eliminated. A savings in time may thus be achieved with respect to performance of some processor-to-bus cycles. In addition, other signals used in connection with processor-to-bus cycles in known techniques may be eliminated.

Other features and advantages of the invention will be more clearly understood upon reading the following description and accompanying drawings and the claims.

DESCRIPTION OF THE PREFERRED EMBODIMENTS

Figure 1:
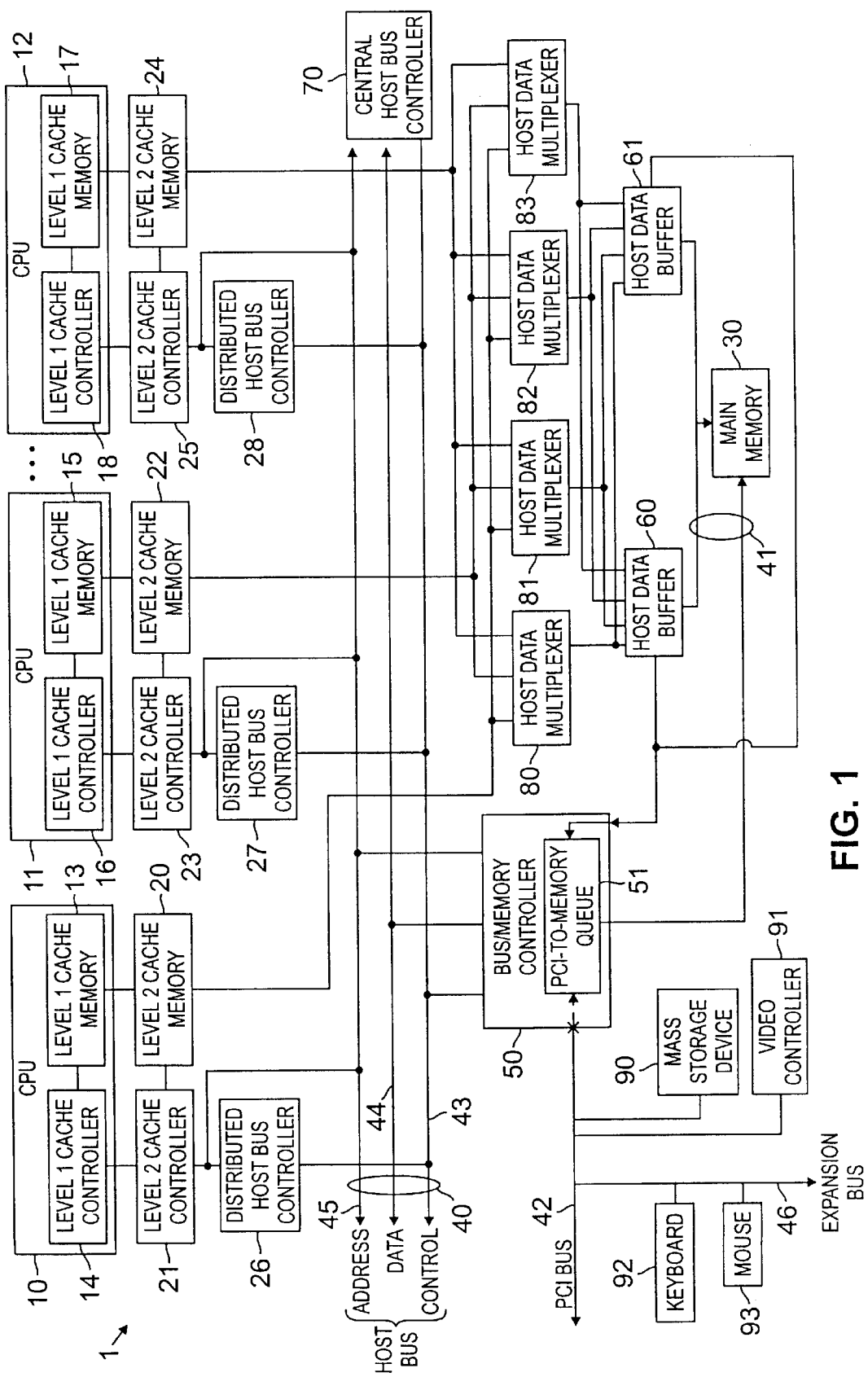
FIG. 1 is a functional block diagram of a multiprocessor system 1.

In FIG. 1, each functional block of a multi-processor system 1 may be implemented, for example, as an integrated chip. The system 1 includes multiple data, address and control buses, including a host bus 40, a memory bus 41 and a peripheral component interface (PCI) bus 42.

The host bus 40 includes address, data and control lines 43, 44, 45, respectively. The data lines 44 may be implemented as multiple point-to-point data lines.

The system 1 also includes a mass storage device 90, such as a hard disk controller, and a video controller 91 including a display unit, connected to the PCI bus 42. In addition, an expansion bus 46 is connected to the PCI bus 42. Peripheral devices, such as a keyboard 92 and a mouse 93, are connected to the expansion bus 46.

A bus and memory controller 50 is used in conjunction with a pair of host data buffers 60, 61 to control the flow of data among the various buses in the system. The bus and memory controller 50 includes a PCI-to-memory queue 51 which is a content addressable memory and which handles PCI write operations and PCI read operations to and from a main memory 30, respectively. The host data buffers 60, 61 serve as a processor-to-memory queue for data flowing from processors, such as CPUs 10, 11, 12, through host data multiplexers 80, 81, 82, 83, to the main memory 30. The host data buffers 60, 61 perform data ordering for read and write cycles. The host data buffers 60, 61 also 30 allow data to flow between the CPUs 10, 11, 12 and the PCI-to-memory queue 51 in the bus and memory controller 50.

As further shown in FIG. 1, a first level cache memory for storing data and a first level cache controller for controlling the flow of data into and out of the first level cache memory is associated with each of the CPUs 10, 11, 12. Thus, for example, the CPU 10 has a cache memory 13 and a cache controller 14. The CPUs 11, 12 also have cache memories 15, 17 and cache controllers 16, 18, respectively. A second level cache memory and second level cache controller is also associated with each of the respective CPUs 10, 11, 12. Thus, for example, the CPU 10 has a second level cache memory 20 and a second level cache controller 21. Similarly, the CPUs 11, 12 have second level cache memories 22, 24 and second level cache controllers 23, 25, respectively. Data stored in one of the first level cache memories 13, 15, 17 can be transferred to the associated second level cache memory 20, 22 or 24. The cache memories may suitably be implemented, for example, using SRAMs.

The CPUs 10, 11, 12 are capable of performing various read or write operations, including write back and write through operations. When a write through operation is performed, for example, data is written directly to the main memory 30 as well as to the associated level two cache memory. In contrast, a cache which is following a write back protocol does not write the data to the main memory until a write back instruction is received.

The caches are divided into lines, each of which is associated with one or more main memory addresses. The system 1 is constructed to allow a cache to occupy one of four states with respect to a cache line. First, the cache may be in an invalid state with respect to a cache line. The invalid state indicates that there is no valid data currently stored in the cache with respect to the memory addresses associated with that cache line. Second, the cache may be in a modified state with respect to the cache line, indicating that only the CPU associated with that cache has retrieved and modified data from any of the main memory addresses associated with the cache line. Third, the cache may be in an exclusive state with respect to the cache line, indicating that only the CPU associated with that cache has retrieved data stored in any of the memory addresses associated with the cache line and that the data has not been modified by the that CPU. Fourth, the cache may be in a shared state with respect to the cache line, indicating that more than one of the CPUs 10, 11, 12 has retrieved data stored in any of the memory addresses associated with the cache line and that the data currently stored in the cache memories associated with those CPUs is the same. Each of the memory addresses associated with a particular cache line occupies the same state as that cache line.

Logic that resides between the level two cache controllers 21, 23, 25 and the bus and memory controller 50 is split into two sections, a central host bus controller 70 and respective distributed host bus controllers 26, 27, 28. Thus, each of the CPUs 10, 11, 12 has a distributed host bus controller 26, 27 or 28 which is located on the respective CPU board.

Each distributed host bus controller 26, 27, 28 functions as an interpreter between its respective level two cache controller 21, 23, 25 and the bus and memory controller 50. The distributed controllers 26, 27, 28 drive various cache controller signals to configure the logical and physical attributes of the respective caches, including, for example, line size, cache size, and data bus width. The distributed controllers 21, 23, 25 also request access to the host bus 40 for various cache controller cycles. Once a specific distributed controller receives access to the host bus 40, it drives the signals on the host address and control lines 43, 45.

The central host bus controller 70 determines which of the various components of the system 1 will be given access to the host bus 40 during specified time intervals. In particular, the central host bus controller 70 arbitrates between competing requests for access to the host bus 40, according to the principles discussed further below.

Certain processor-to-bus cycles require performance of a write cycle to the main memory 30 to save data prior to performance of the processor-to-bus cycle. Thus, for example, a processor-to-PCI bus read cycle requires that the PCI-to-memory queue 51 be flushed and written to the main memory 30 in order to prevent the reading of stale data from the main memory 30. Similarly, prior to flushing the PCI-to-memory queue 51, a snoop routine is performed with respect to each line of data in the queue 51 to help ensure that the data stored in the main memory is not stale. Details of these steps are discussed below.

Before discussing the invention further, it is useful to explain how an exemplary known system functions. Reference will be made to certain components of the system of FIG. 1 that are common to the known system.

Figure 2:
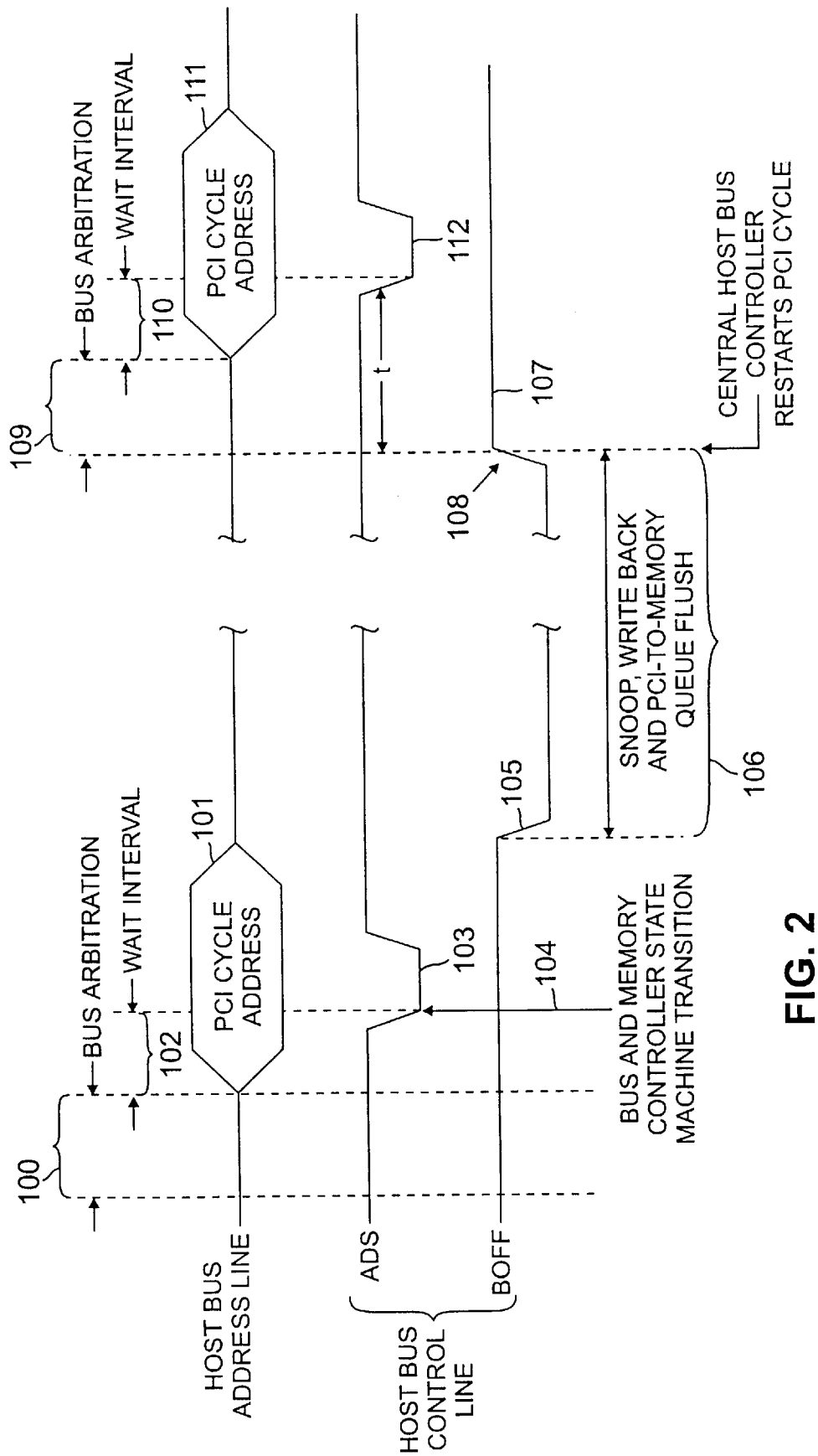
FIG. 2 is a timing diagram of signals in a processor-to-bus cycle according to a known technique.

FIG. 2 illustrates a timing diagram for signals occurring during an exemplary processor-to-PCI cycle according to one known technique. A CPU initiates a cycle to the PCI bus 42, for example. During a subsequent bus arbitration period, shown as 100 in FIG. 2, a central controller grants control of a host bus to the CPU, which asserts a PCI cycle address at the beginning of a wait interval 102. Following the wait interval 102, the central controller then asserts an ADS signal 103. The ADS signal is a host address strobe signal and indicates that the PCI cycle address signal is valid. The ADS signal triggers a transition 104 of a state machine associated with the operation of the bus and memory controller 50. Specifically, the bus and memory controller 50 asserts a signal indicating that it has committed to running the PCI cycle.

To allow for performance of the snoop routine and the step of flushing the PCI-to-memory queue, according to the known technique, the bus and memory controller 50 asserts a back off ("BOFF") signal 105 which tells the central controller that the bus and memory controller 50 should not complete the current processor-to-PCI cycle request.

In response to assertion of the BOFF signal 105, the central controller instructs the first CPU to terminate its current cycle to PCI. Performance of the snoop routine occurs during an interval 106 commencing with the assertion of the BOFF signal 105. Any modified data that must be written back to the PCI-to-memory queue 51 as a result of the snoop routine is written to the PCI-to-memory queue 51 during the period 106. Similarly, the PCI-to-memory queue 51 is flushed to the main memory 30 during this same period 106.

According to the technique of FIG. 2, once the PCI-to-memory queue 51 has been flushed, the bus and memory controller 50 no longer asserts the BOFF signal, as shown by 107 in FIG. 2. At a time indicated by 108 in FIG. 2, the central controller restarts the processor-to-PCI cycle by instructing the first CPU to reinitiate its PCI cycle. This reinitiation requires a new bus arbitration period 109 during which control of the host bus is again granted to the first CPU. The CPU gains control of the host bus and initiates a new PCI cycle address signal 111. After a wait interval 110 passes, the central controller 70 again asserts an ADS signal 112, and the CPU is allowed to continue its cycle to PCI.

Figure 3:
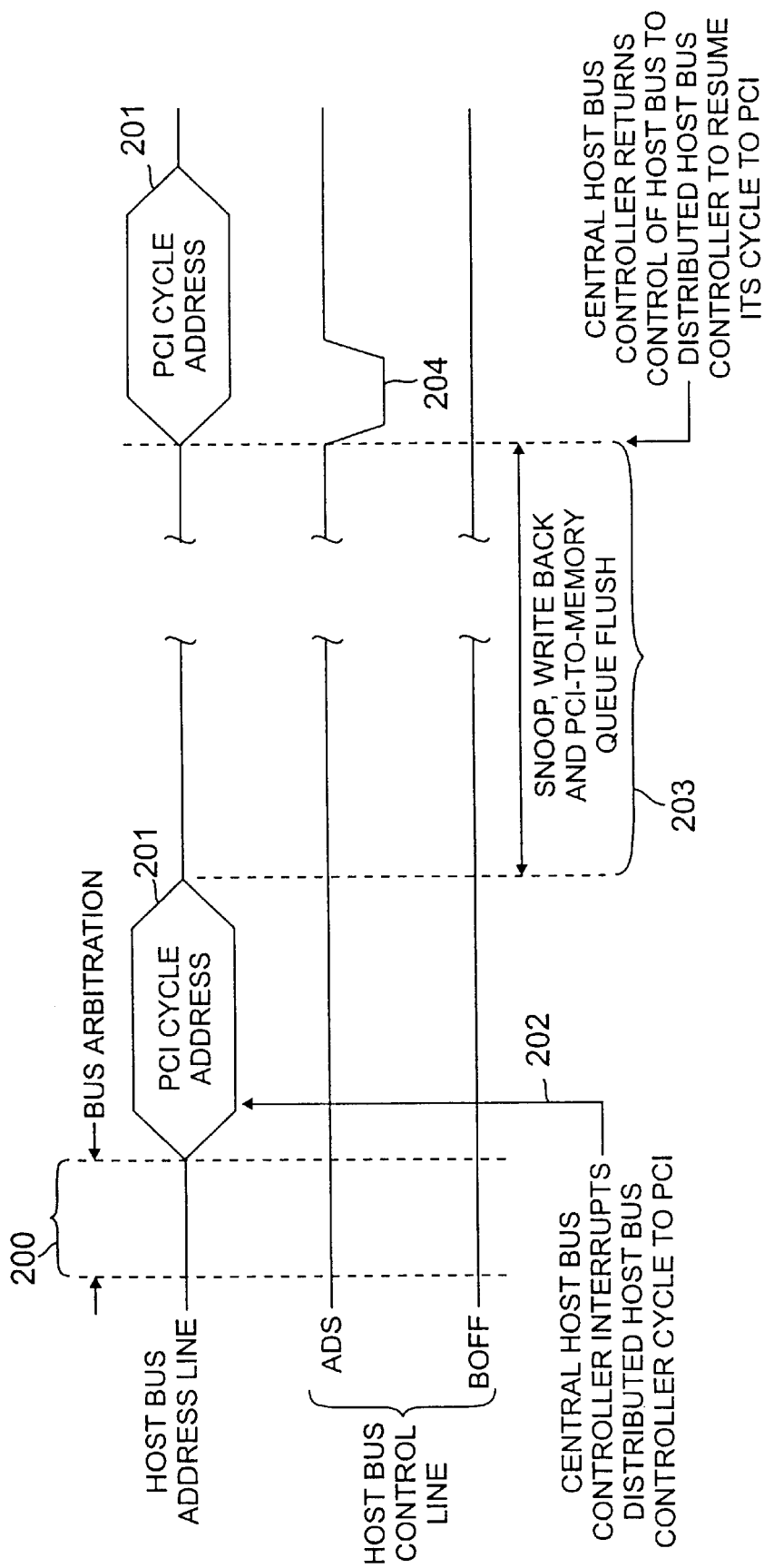
FIG. 3 is a timing diagram of signals in a processor-to-bus cycle according to the present invention.
Figure 4:
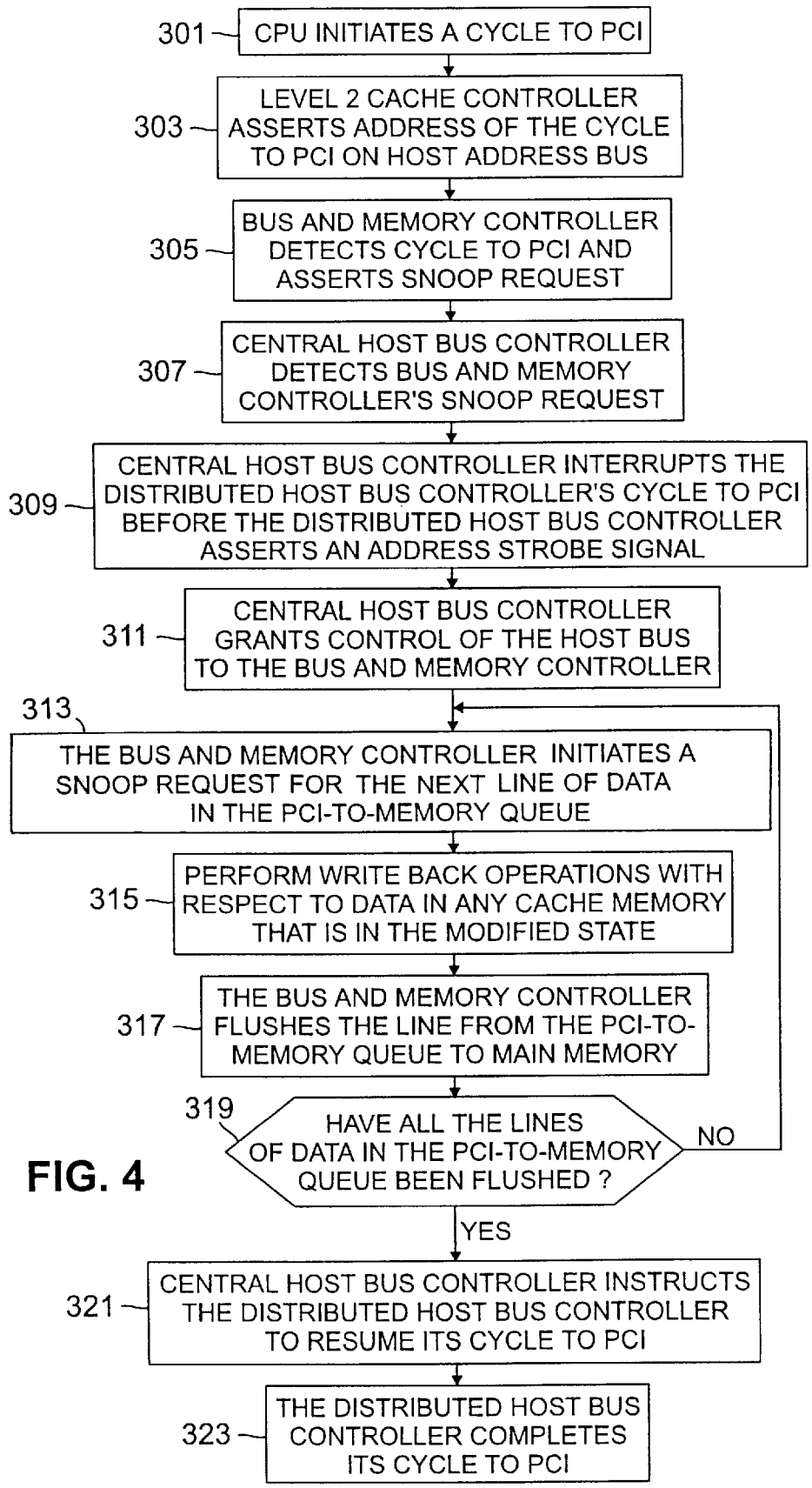
FIG. 4 is a flow chart of a method of performing a processor-to-bus cycle according to the present invention.

FIGS. 3 and 4 illustrate a method of performing a processor-to-PCI cycle according to the present invention.

With reference to FIG. 4, the CPU 10, for example, initiates a processor-to-PCI cycle by requesting access to the host bus 40, as indicated by step 301. A bus arbitration period, indicated by 200 in FIG. 3, occurs during which the central host bus controller 70 grants the CPU 10 access to the host bus 40. The distributed controller 26 associated with the CPU 10 then instructs the level two cache controller 21 to assert the address for the cycle to PCI on the host address bus 45, as indicated by step 303. Assertion of the PCI cycle address is shown as 201 in FIG. 3.

As indicated by step 305, the bus and memory controller 50 detects the cycle to PCI and asserts a snoop request, in other words, a signal which indicates to the central controller 70 that the bus and memory controller 50 requests access to the host bus 40 to permit performance of the snoop routine. Next, as shown by step 307, the central controller 70 detects the snoop request asserted by the bus and memory controller 50. In response to receipt of the snoop request, the central controller 70 instructs the distributed controller 26 to interrupt the PCI cycle prior to assertion of an ADS signal. In this manner, the PCI cycle is interrupted rather than terminated, as indicated by step 309. Interruption of the PCI cycle is indicated by 202 in FIG. 3. The central controller 70 then grants control of the host bus 40 to the bus and memory controller 50 to perform the snoop routine and to flush the PCI-to-memory queue 51, as shown by step 311. It will be noted that assertion of the BOFF signal is not required to interrupt the PCI cycle.

The snoop routine is performed during the time interval 203 in FIG. 3. In general, the snoop routine determines whether any of the cache memories 20, 22, 24 is in a modified state with respect to a main memory address for which data is currently stored in the PCI-to-memory queue 51. A suitable snoop routine is described in the aforementioned U.S. patent application Ser. No. 08/662,479.

Since each line of data in the PCI-to-memory queue 51 may be written to a different address in the main memory 30, the bus and memory controller 50 initiates performance of the snoop routine for each line of data in the PCI-to-memory queue 51, as indicated by step 313. Specifically, the bus and memory controller 50 asserts a snoop request signal which is sent to the central host bus controller 70. The central controller 70 forwards the snoop request signal to each of the distributed host bus controllers 26, 27, 28, which instruct the associated cache controllers 21, 23, 25 to determine what state each of the associated cache memories 20, 22, 24 occupies with respect to the specified memory address. First, however, any data stored in the first level cache memories 13, 15, 17 and associated with the specified memory address is transferred to the respective second level cache memory 20, 22 or 24.

Each of the level two cache controllers 21, 23, 25 responds by generating a snoop response signal indicating the state occupied by its associated memory 20, 22, 24 with respect to the main memory address to which the particular line of data in the queue 51 is to be written. The central controller 70 monitors the snoop responses as they are received and determines whether a received snoop response indicates that a cache memory is in a modified state with respect to the main memory address to which the particular line of data in the PCI-to-memory queue 51 is to be written.

If a received snoop response indicates that a cache memory is in a modified state with respect to the specified main memory address, then the level two cache controller associated with that cache memory initiates a write back operation, as indicated by step 315. Assuming, for example, that data stored in the cache memory 22 with respect to a specified memory address has been modified by the CPU 11 then the cache controller 23 associated with the CPU 11 would initiate the write back cycle to the bus and memory controller 50. The central controller 70 then grants control of the host bus 40 to the distributed controller 27 associated with the cache controller 23 and cache memory 22. The modified data is then sent from the cache memory 22 to the bus and memory controller 50 where it is stored in the PCI-to-memory queue 51.

Once snoop responses have been received from the cache memories 20, 22, 24 and once any required write back operations have been performed, the central controller 70 allows the bus and memory controller 50 to flush or write the current line of data from the PCI-to-memory queue 51 to the main memory 30, as indicated by step 317. It should also be noted that in certain implementations of the invention, if a received snoop response indicates that one of the cache memories 20, 22, 24 is in the exclusive or shared state with respect to the specified memory address, then the central controller 70 immediately terminates the snoop routine and allows the bus and memory controller 50 to flush the current line of data to the main memory 30. Similarly, in certain implementations, if information stored in the bus and memory controller 50 indicates that the memory address to be accessed is non-cacheable, then the snoop routine is terminated without awaiting further snoop responses from the CPUs. Performance of the write back operation and flushing the PCI-to-memory queue also take place during the interval 203 in FIG. 3.

As indicated by 319 in FIG. 4, if the line of data flushed to the main memory 30 in step 317 is not the last line in the PCI-to-memory queue 51, then the bus and memory controller 50 requests performance of the snoop routine with respect to the next line in the queue 51. Performance of the steps 313–319 is repeated until each line of data currently in the queue 51 is flushed.

Once all the lines of data currently in the queue 51 are flushed to the main memory 30, the central controller 70 returns control of the host bus 40 to the distributed host bus controller 26. As indicated by step 321, the distributed host bus controller 26 is instructed by the central controller 70 to resume its cycle to PCI from the point at which it was interrupted. The PCI cycle need not be restarted. Rather, the central controller 70 asserts an ADS signal to indicate to the bus and memory controller 50 that the PCI cycle address signal asserted by the cache controller 21 is valid. The ADS signal is shown as 204 in FIG. 3. In response, the bus and memory controller 50 asserts a signal indicating that it has committed to running the PCI cycle. The distributed host bus controller 26 is thus allowed to complete its cycle to PCI, as indicated by step 323.

The technique of FIG. 3 saves time relative to the technique of FIG. 2 because the processor-to-bus cycle is interrupted, rather than terminated, to allow for performance of the snoop routine and flushing of the PCI-to-memory queue. As explained above, once the PCI-to-memory queue 51 is flushed, the central controller 70 automatically returns control of the bus 40 to the distributed controller 26 and asserts the ADS signal if the PCI cycle address is still being asserted by the CPU 10. Thus, in the technique of FIG. 3, a new bus arbitration period is not required to give the distributed controller 26 control or access to the bus 40.

Other embodiments are within the scope of the following claims.

What is claimed is:

1. A method for use in connection with performing a processor-to-bus cycle in a multiprocessor system, comprising:

detecting a processor-to-bus cycle other than a processor-to-host-bus cycle;

requesting access to the host bus to perform a snoop routine in response to detecting said processor-to-bus cycle;

interrupting said processor-to-bus cycle before completion, in response to requesting access to the host bus;

performing an operation to save data in memory; and thereafter resuming the processor-to-bus cycle other than at the beginning by returning control of the host bus to a distributed controller associated with the processor that initiated the processor-to-bus cycle.

2. The method of claim 1 wherein performing a said operation to save data in memory comprises flushing a data queue to the memory.

3. The method of claim 2 wherein performing a said operation to save data to memory further comprises performing a snoop routine with respect to data in the queue.

4. The method of claim 3 further comprising performing at least one write back operation as a result of the snoop routine.

5. The method of claim 1 wherein the processor-to-bus cycle is a cycle to a peripheral component interface (PCI) bus and wherein performing an operation to save data in memory comprises flushing a PCI-to-memory queue.

6. The method of claim 1 wherein the processor-to-bus cycle comprises asserting an address strobe signal after the interrupted processor-to-bus cycle has resumed.

7. The method of claim 1 wherein performing an operation to save data in memory comprises flushing a data cache to the memory.

8. A multi-processor system comprising:

a first bus and a second bus;

a plurality of processors each of which can initiate cycles to the first bus and each of which has a respective cache memory associated with it;

a main memory;

a mass storage device;

a bus and memory controller which controls the flow of data between the first bus and the second bus and which is connected to the processors via the second bus, wherein the bus and memory controller is operable to request control of the second bus in response to initiation of a cycle to the first bus, and wherein the bus and memory controller comprises a data queue from the first bus to the main memory;

a central controller operable to cause the cycle to the first bus to be interrupted in response to the request for control of the second bus by the bus and memory controller, said interrupt occurring before assertion of an address strobe signal by said central controller, said central controller further operable to provide a signal instructing the processor that initiated the cycle to the first bus to resume the interrupted cycle to the first bus following performance of an operation requiring access to the second bus by the bus and memory controller;

wherein the bus and memory controller is operable to perform a snoop routine with respect to data stored in the cache memories prior to resumption of the cycle to the first bus, and wherein the bus and memory controller is further operable to update data stored in the data queue to the main memory prior to resumption of the cycle to the first bus.

9. A multi-processor system comprising:

a first bus and a second bus;

a plurality of processors each of which can initiate cycles to the first bus and each of which has a respective cache memory associated with it;

a main memory;

a mass storage device;

a bus and memory controller which controls the flow of data between the first bus and the second bus and which is connected to the processors via the second bus, wherein the bus and memory controller is operable to request control of the second bus in response to initiation of a cycle to the first bus, and wherein the bus and memory controller comprises a data queue from the first bus to the main memory;

a central controller operable to cause the cycle to the first bus to be interrupted, prior to assertion by the central controller of an address strobe signal, in response to the request for control of the second bus by the bus and memory controller and which is operable to provide a signal instructing the processor that initiated the cycle to the first bus to resume the cycle to the first bus following performance of an operation requiring access to the second bus by the bus and memory controller;

wherein the bus and memory controller is operable to perform a snoop routine with respect to data stored in the cache memories prior to resumption of the cycle to the first bus, and wherein the bus and memory controller is further operable to flush the data queue to the main memory prior to resumption of the cycle to the first bus.

10. The system of claim 9 wherein the cycle to the first bus comprises assertion of an address strobe signal by the central controller, and wherein the central controller is operable to interrupt the cycle to the first bus prior to assertion of the address strobe signal.

11. An apparatus for use in a multiprocessor system, the apparatus comprising:

means for detecting a processor-to-bus cycle other than a processor-to-host-bus cycle;

means for requesting access to a host bus to perform a snoop routine in response to detecting the processor-to-bus cycle;

means for interrupting the processor-to-bus cycle before completion, in response to operation of said means requesting access to the host bus;

means for performing an operation to save data in memory; and means for thereafter resuming the processor-to-bus cycle other than at the beginning by returning control of the host bus to a distributed controller associated with a processor that initiated the processor-to-bus cycle.

12. The apparatus of claim 11 including:

means for denying access to a host bus to a processor that initiated the processor-to-bus cycle; and means for granting access to the host bus to the processor that initiated the processor-to-bus cycle.

13. The apparatus of claim 11 including means for flushing a data queue to the memory.

14. The apparatus of claim 11 including means for performing at least one write back operation as a result of the snoop routine.

* * * * *